United States Patent
Markel et al.

(10) Patent No.: US 8,089,941 B2
(45) Date of Patent: Jan. 3, 2012

(54) MOBILE COMMUNICATION DEVICE AND SYSTEM SUPPORTING PERSONAL MEDIA RECORDER FUNCTIONALITY

(75) Inventors: Shlomo Markel, Haifa (IL); Michael Civiello, Scottsdale, AZ (US)

(73) Assignee: Broadcom Corporation

( * ) Notice: Subject to any disclaimer, the term of this patent is extended or adjusted under 35 U.S.C. 154(b) by 645 days.

(21) Appl. No.: 11/112,631

(22) Filed: Apr. 22, 2005

(65) Prior Publication Data
US 2006/0126583 A1 Jun. 15, 2006

Related U.S. Application Data

(60) Provisional application No. 60/635,124, filed on Dec. 10, 2004.

(51) Int. Cl.
*H04W 4/00* (2009.01)
(52) U.S. Cl. .......... 370/338; 455/556.1; 725/41; 725/55
(58) Field of Classification Search .................. 370/338; 455/556.1; 725/41, 55
See application file for complete search history.

(56) References Cited

U.S. PATENT DOCUMENTS

| | | | |
|---|---|---|---|
| 6,460,138 B1 * | 10/2002 | Morris | 713/184 |
| 6,868,283 B1 * | 3/2005 | Bonansea et al. | 455/566 |
| 7,003,080 B1 * | 2/2006 | Doskow et al. | 379/32.03 |
| 2002/0090195 A1 | 7/2002 | Tada | |
| 2003/0103607 A1 * | 6/2003 | Feakes | 379/88.17 |
| 2004/0071088 A1 * | 4/2004 | Curcio et al. | 370/235 |
| 2004/0177378 A1 * | 9/2004 | Cool | 725/89 |
| 2005/0245240 A1 * | 11/2005 | Balasuriya et al. | 455/414.1 |
| 2006/0010472 A1 * | 1/2006 | Godeny | 725/62 |

FOREIGN PATENT DOCUMENTS

| | | |
|---|---|---|
| CN | 1336064 A | 2/2002 |
| EP | 1443511 | 4/2004 |
| WO | 02/03683 | 1/2002 |
| WO | 03/019945 | 3/2003 |

OTHER PUBLICATIONS

European Search Report corresponding to European Patent Application No. 05018588.3-1522 dated Oct. 6, 2009.
EPO Communication dated Mar. 31, 2011 in Application No. 05 018 588.3-1522.
EPO Communication dated Nov. 16, 2010 in Application 05 018 588.3-1522.

* cited by examiner

*Primary Examiner* — Patrick Edouard
*Assistant Examiner* — Chuck Huynh
(74) *Attorney, Agent, or Firm* — McAndrews, Held & Malloy, Ltd.

(57) ABSTRACT

A system and method for presenting information to a user of a mobile communication device. Various aspects of the present invention comprise receiving and presenting a first portion of media information to a user. While presenting the first portion of the media information to the user, a first signal may be received. In response to the first signal, a second portion of the media information may be received and buffered. A second signal may be received, and in response to the second signal, the second portion of the media information may be presented to the user. While the second portion of the media information is presented to the user, a third portion of the media information may be received and buffered. Various aspects of the present invention may also comprise a mobile communication device that receives, presents and/or buffers various portions of media information.

34 Claims, 4 Drawing Sheets

MOBILE COMMUNICATION DEVICE AND SYSTEM SUPPORTING PERSONAL MEDIA RECORDER FUNCTIONALITY

CROSS-REFERENCE TO RELATED APPLICATIONS/INCORPORATION BY REFERENCE

This patent application is related to and claims priority from provisional patent application Ser. No. 60/635,124, filed Dec. 10, 2004, and titled "MOBILE COMMUNICATION DEVICE AND SYSTEM SUPPORTING PVR FUNCTIONALITY," the contents of which are hereby incorporated herein by reference in their entirety. This patent application is related to U.S. patent application Ser. No. 11/112,099, filed Apr. 22, 2005, entitled "MOBILE COMMUNICATION DEVICE AND SYSTEM SUPPORTING MEDIA FLOW CONTROL", the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A user utilizing a mobile (or portable) communication device for consuming media information (e.g., viewing and/or listening to media information) may often be interrupted. Also a user utilizing a mobile communication device for consuming media may desire to temporarily utilize the mobile communication device for other functionality (e.g., other communications, game playing, time management, document processing, etc.) provided to the user by the mobile communication device. Such other functionality may, for example, be unrelated to the media information presently being consumed. Such an interruption, for example when a user is consuming information communicated to the mobile communication device in real-time, may result in a user missing media information communicated during the interruption.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for presenting media information to a user of a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
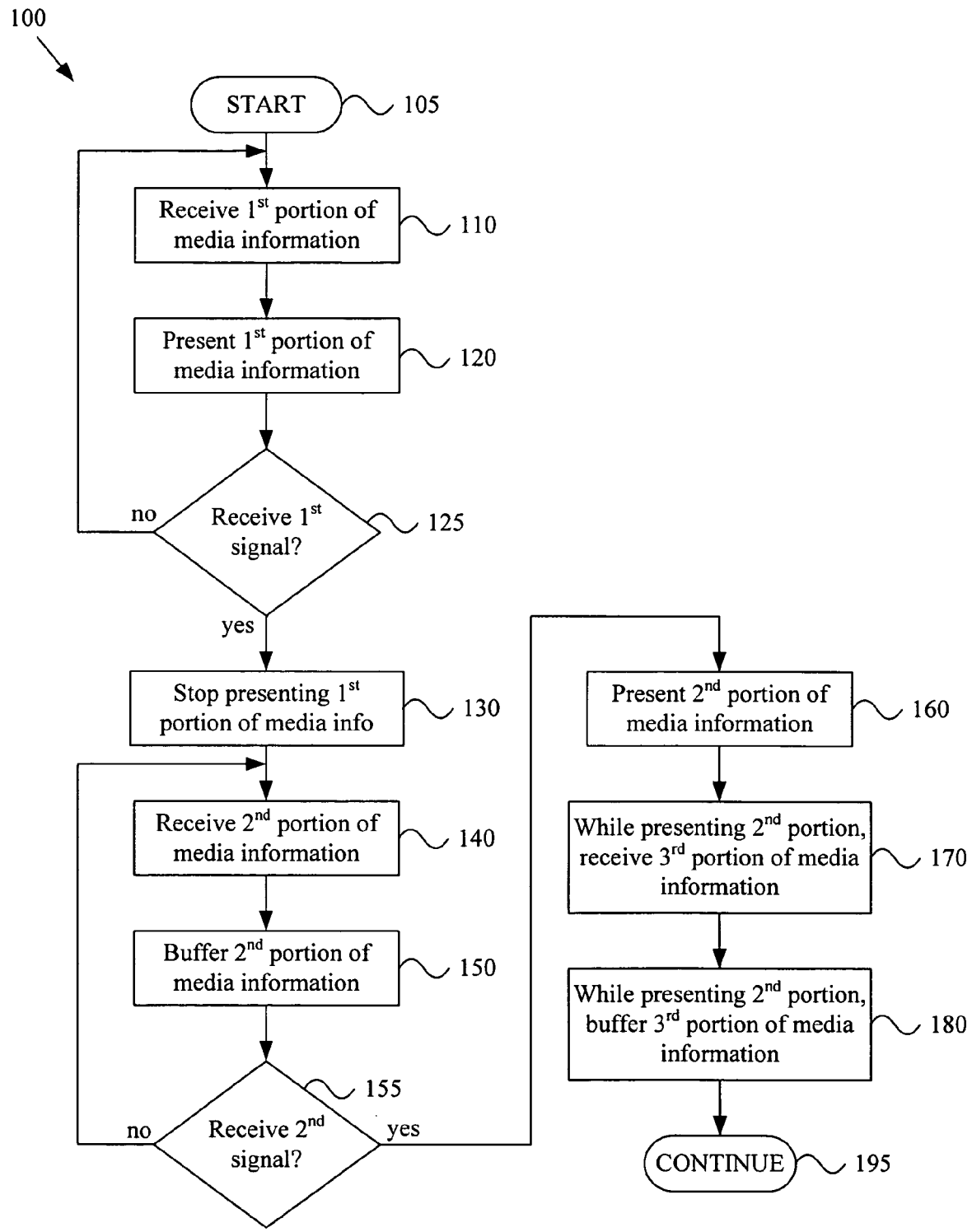
FIG. 1 is a diagram illustrating a method for presenting media information to a user of a mobile communication device, in accordance with various aspects of the present invention.

FIG. 1 is a diagram illustrating a method 100 for presenting media information to a user of a mobile communication device, in accordance with various aspects of the present invention. The media information may comprise characteristics of any of a variety of types of information. For example and without limitation, the media information may comprise multi-media, video, audio, textual, graphical, pictorial and other known types of information. For example, the media information may comprise movie, television program, sporting event, gaming or music information. The term "media information" will be used in the following discussion to generally refer to any or all of such types of information. Additionally, the term "consume," when applied to a user consuming media information may generally apply to any of viewing, listening, reading, feeling or any other known manner in which a user takes in, perceives, processes or comprehends information.

The mobile communication device may comprise characteristics of any of a variety of mobile communication devices. For example and without limitation, the mobile communication device may comprise characteristics of a two-way communication device (e.g., a cellular telephone, mobile e-mail device, two-way pager, pocket computer with media communication and two-way communication capability, etc.). The scope of various aspects of the present invention should not be limited by characteristics of a particular type of mobile communication device.

The exemplary method 100 may begin at step 105. The method 100 (and other methods discussed herein) may begin for any of variety of reasons. For example and without limitation, the method 100 may begin in response to an explicit user command to begin. Also for example, the method 100 may begin upon resetting or powering up the mobile communication device. Further for example, the method 100 may begin in response to a signal received from another communication system. Accordingly, the scope of various aspects of the present invention should not be limited by characteristics of any particular initiating causes or conditions.

The exemplary method 100 may, at step 110, comprise receiving a first portion of media information (e.g., a unit of media information). A "unit of media information" may, for example and without limitation, comprise characteristics of a television program, a song, a slideshow, a movie, a music video, televised or radio-broadcast sporting event, an audio newscast, a stock ticker, etc. Step 110 may comprise receiving the media information in any of a variety of manners (e.g., receiving media broadcast, multicast, unicast, streaming, etc.). Step 110 may comprise receiving the media information over any of a variety of communication media and utilizing any of a variety of communication protocols. For example and without limitation, step 110 may comprise receiving the media information over a wireless RF medium and utilizing a cellular telephony communication protocol. Also, for example, step 110 may comprise receiving the media information through a wired, tethered optical or non-tethered optical medium, and utilizing any of a large variety of wired, wireless or optical communication protocols that are presently known or to be developed. In general, step 110 may comprise receiving a first portion of media information (e.g., a first portion of a unit of media information). Accordingly, the scope of various aspects of the present invention should not be limited by characteristics of any particular manner of receiving media information.

The exemplary method may, at step 120, comprise presenting the first portion of the media information (e.g., the first portion of the unit of media information) to a user (e.g., in a human-perceivable form). Step 120 may comprise presenting the first portion of the media information to a user in any of a variety of manners. For example and without limitation, step 120 may comprise presenting the first portion of the media information to a user with a user interface module of the mobile communication device (e.g., a video display, speaker, etc.). Step 120 may, for example, comprise providing the user with various mechanisms (e.g., various display and audio control mechanisms) for controlling the presentation of the first portion of the media information to the user. In general, step 120 may comprise presenting the first portion of the media information (e.g., the first portion of the unit of media information) to a user. Accordingly, the scope of various aspects of the present invention should not be limited by any particular manner of presenting media information to a user.

The exemplary method 100 may, for example, comprise receiving (e.g., at step 110) and presenting (e.g., at step 120) the first portion of the media information until a first signal is received. For example, the method 100 may, at step 125, control execution flow of the method 100 depending on whether such a first signal is received. In an exemplary scenario where the first signal has not yet been received, step 125 may direct execution flow of the method 100 back up to step 110 for continued reception and presentation. In another exemplary scenario where the first signal has been received, step 125 may direct execution flow of the method 100 to step 130, which will be discussed below.

The first signal may, for example, be representative of a user input to the mobile communication device. For example and without limitation, the first signal may result from a user input indicative of the user desiring to respond to an incoming communication or generate an initial outgoing communication. Also for example, the first signal may result from a user input indicative of the user desiring to change the manner in which a unit of media information is being presented to the user by the mobile communication device. For example, the first signal may be indicative of the user desiring to (at least temporarily) pause presentation of media information. The first signal may also, for example, correspond to a signal originated by the mobile communication device. For example, the signal may correspond to an internally generated alarm or other user notification.

In a non-limiting exemplary scenario, the mobile communication device may be presenting media information to a user (e.g., at step 120) when an incoming communication arrives at the mobile communication device (e.g., a cellular phone call). Continuing the exemplary scenario, step 125 (or another step) may comprise providing the user with an indication of the incoming communication and provide the user with options for responding to the incoming communication. For example, the exemplary method 100 may comprise notifying the user of the incoming communication by providing a visible, audible and/or tactile indication. The user may then, for example, provide input to the mobile communication device to direct the mobile communication device in handling the incoming communication. For example the user may provide an input to ignore the incoming communication, direct the incoming communication to a messaging function, or answer the incoming communication. A user input directing the mobile communication device to answer the incoming communication provides a non-limiting example of a first signal that step 125 may be waiting for.

Alternatively, for example, the first signal may originate at another communication system (or be indicative of a signal originating at another communication system). For example and without limitation, the first signal may originate at a remote communication system that is attempting to communicate with the mobile communication device (e.g., with the user). For example, in this scenario, the first signal may comprise a signal indicative of an incoming telephone call, videophone call, instant text message or email message. In general, the first signal may comprise any of a variety of signal characteristics and may originate at any of a variety of sources. Accordingly, the scope of various aspects of the present invention should not be limited by characteristics of any particular signal.

The exemplary method 100 may, at step 130, comprise ceasing (or stopping) presentation of the first portion of the media information. As mentioned previously, in response to receiving the first signal, step 125 may direct execution flow of the exemplary method 100 to step 130. Step 130 may, for example, comprise ceasing presentation of the first portion of the media information in any of a variety of manners, which may depend on the type of media information being presented. For example and without limitation, step 130 may comprise blanking a video output screen or presenting a display-saver image, silencing an audio output speaker, freezing an image on a video output screen, etc.

Also for example, step 130 may comprise outputting a user interface indication on a video output screen that is related to the received first signal. As a non-limiting example, step 130 may comprise presenting the user with options concerning how to handle an incoming communication. As another non-limiting example, step 130 may comprise presenting the user with options concerning how to resume presentation of the media information. As still another non-limiting example, step 130 may comprise presenting the user with options for executing any of a variety of functionality provided by the mobile communication device.

In general, step 130 may comprise ceasing presentation of the first portion of the media information. Accordingly, the scope of various aspects of the present invention should not be limited by characteristics of any particular manner of ceasing such presentation or by characteristics of any additional related user interface functionality that may be performed.

The exemplary method 100 may, at step 140, comprise receiving a second portion of the media information (e.g., a second portion of the unit of media information). Step 140 may, for example and without limitation, share various characteristics with exemplary step 110, discussed previously.

For example and without limitation, a second portion of the media information may comprise a second portion of a television program or period of television programming, a song, a slideshow, a movie, a music video, a televised or radio-broadcast sporting event, an audio newscast, a stock ticker, etc., where the first portion was received at step 110 and presented at step 120. As with step 110, step 140 may comprise receiving the media information in any of a variety of manners (e.g., receiving media broadcast, multicast, unicast, streaming, etc.), which may, for example but not necessarily, comprise the same manner in which the first portion of the media information was received at step 110. Also, step 140 may, for example, comprise receiving the media information over any of a variety of communication media and utilizing any of a variety of communication protocols. In general, step 140 may comprise receiving a second portion of media information (e.g., a second portion of the unit of media information, the first portion of which was received at step 110). Accordingly, the scope of various aspects of the present invention should not be limited by characteristics of any particular manner of receiving media information.

The exemplary method 100 may, at step 150, comprise buffering the second portion of media information (e.g., as received at step 140). Step 150 may comprise buffering the second portion of media information (e.g., a second portion of the unit of information) in any of a variety of manners. For example and without limitation, step 150 may comprise storing the media in a buffer until the buffer is full, only storing media information that has not already been presented to the user, and then stop storing new media information when the buffer becomes full. Alternatively, for example, step 150 may comprise storing the media information in a buffer until the buffer is full and then continuing to store the media in a rolling manner, replacing the oldest media information with the newest media information. Also for example, step 150 may comprise storing the media information in a local memory until the local memory has reached a particular state of fullness and then storing additional media information in a removable memory (e.g., a storage card, memory stick, etc.). The scope of various aspects of the present invention should not be limited by characteristics of any particular manner of storing media information.

Step 150 may, in various non-limiting exemplary scenarios, comprise performing various acts of compression on the stored media information. For example and without limitation, step 150 may comprise spatially and/or temporally compressing buffered media information. In such an exemplary scenario, the exemplary method 100 may comprise trading off later media presentation quality for buffer space, for example, ensuring that the user may at least consume the media information at a relatively coarse level, versus consuming a first segment of the media information at a relatively fine level but completely missing a second segment of the media information. In the non-limiting exemplary scenario, step 150 may also comprise modifying the level of compression according to remaining buffer capacity (e.g., performing relatively little or no compression when a relatively high amount of buffer capacity remains and performing relatively high compression when a relatively low amount of buffer capacity remains). In another non-limiting exemplary scenario, step 150 may compress or re-compress media information that has already been buffered to make room in the buffer space for additional media information. The scope of various aspects of the present invention should not be limited by the existence of compression or by characteristics of any particular manner in which media information may be compressed.

Step 150 may comprise buffering the second portion of the media information in any of a variety of media buffer (or memory) types. For example and without limitation, step 150 may comprise buffering the media information in an on-board memory chip of the mobile communication device or a local hard drive (e.g., a mini hard drive) of the mobile communication device. Also for example, step 150 may comprise buffering the media information in a removable memory chip (e.g., a removable memory module, card, or stick inserted into the mobile communication device). Further for example, step 150 may comprise buffering the media information in a memory device that is external to the mobile communication device and communicatively coupled (e.g., coupled by wire, wirelessly coupled or optically coupled) to the mobile communication device.

The buffer may have various capacity characteristics. For example and without limitation, the buffer may comprise capacity to store media information for a duration of less than a unit of information. The buffer may, for example, comprise capacity to store media information for a duration of a typical interruption in media information presentation (e.g., a telephone call). The buffer may, for example, comprise capacity to store media information for N typical media presentation interruptions. Alternatively for example, the buffer may comprise capacity to store media information corresponding to at least one, or more than one, unit of media information (e.g., one or N movies or songs). In such an example, the buffer may also be preloaded with one or more entire units of information for consumption at a convenient time. Such preloading may, for example and without limitation, occur through a communication network at off-peak times to efficiently utilize communication bandwidth. The scope of various aspects of the present invention should not be limited by characteristics of a particular type of buffer memory device or capacity of a particular buffer memory.

The exemplary method 100 may, for example, comprise receiving (e.g., at step 140) and buffering (e.g., at step 150) the second portion of the media information until a second signal is received. For example, the method 100 may, at step 155, control execution flow of the method 100 depending on whether such a second signal has been received. In an exemplary scenario where the second signal has not yet been received, step 155 may direct execution flow of the method 100 back up to steps 140 and 150 for continued reception and buffering. In another exemplary scenario where the second signal has been received, step 155 may direct execution flow of the method 100 to step 160, which will be discussed below.

The second signal may comprise any of a variety of characteristics. For example and without limitation, the second signal may be representative of a user input indicative of the user ending a communication (e.g., ending a phone call, completing transmission of a message, etc.) or other function (e.g., making a notebook entry, finishing a game, etc.). Also for example, the second signal may result from a user input indicative of the user desiring to change the manner in which a unit of media information is being presented to the user by the mobile communication device. For example, the second signal may be indicative of the user desiring to resume normal presentation of media information, the presentation of which was previously altered (e.g., paused during the performance of another communication).

Alternatively, for example, the second signal may originate at a remote source (e.g., a remote communication system). For example and without limitation, the second signal may originate at a remote communication system that is completing communication with the mobile communication device (e.g., indicating that the remote communication system has completed communicating with the mobile communication device). In general, the second signal may comprise any of a variety of signal characteristics and may originate at any of a variety of sources. Accordingly, the scope of various aspects of the present invention should not be limited by characteristics of any particular signal.

In a non-limiting exemplary scenario, the method 100 may, in response to the first signal, cease presentation of the media information to a user. However, the method 100 may still receive and buffer the media information (e.g., by looping through steps 140 and 150) for later consumption by the user (e.g., when step 155 comprises determining that the second signal has been received). The user may thus respond to an interruption (e.g., an incoming communication or other interruption) during the consumption of media information and resume consumption of the media information when the interruption is over, without missing the portion of the media information that the user might normally have missed during the interruption.

After receiving the second signal, the method 100 may, at step 160, comprise presenting the second portion of the media information (e.g., the second portion of the unit of media information, the first portion of which was presented at step 120) to the user. Step 160 may comprise presenting the second portion of the media information to the user in any of a variety of manners. For example and without limitation, step 160 may comprise presenting the second portion of the media information in a manner similar to that utilized in step 120 to present the first portion of the media information.

In a non-limiting exemplary scenario, the exemplary step 120 may have comprised presenting the first portion of the media information to the user generally as the first portion of the media information was received (e.g., in real-time) at step 110. Continuing the exemplary scenario, step 160 may then comprise presenting the second portion of the media information to the user from a media buffer (e.g., utilized by step 150 to buffer media information). Such presentation may, for example and without limitation, be controlled by the user.

In presenting the second portion of the media information (e.g., a second portion of the unit of media information) to the user, step 160 may, for example, comprise providing media presentation control features to the user at a user interface. For example, step 160 may comprise providing the user the ability to specify presentation of the second portion of the media information in fast-forward mode. In a non-limiting exemplary scenario, the second portion of the media information may temporally lead a third portion of the media information. In other words, the user may be consuming media information (e.g., the second portion) that is temporally earlier than media information arriving in real-time (e.g., a third portion), which is being received and buffered (e.g., at steps 170 and 180) while the user is consuming the temporally earlier second portion of the media information. The user may, for example, specify a fast-forward mode to expeditiously consume the second portion of the media information, which would allow the user to catch up to real-time presentation of the media information.

Further for example, step 160 may comprise providing a rewind (or review) capability to the user. For example, step 160 may comprise retaining a particular amount of previously presented media information in a media buffer and providing a user interface allowing the user to specify rewinding or reviewing such media information. Also for example, step 160 may comprise providing the user the capability to consume the media information in any manner that media information is generally consumed (e.g., trick play and/or normal play capability, including pause, slow-motion, forward and reverse at various speeds, etc.).

As another example of user interface capability, step 160 may comprise providing to the user an indication of the state of fullness of a media buffer. For example, step 160 may comprise providing a visual indication on an output display that notifies the user how much information is stored in the media buffer. Step 160 may, for example, comprise providing an indication notifying the user how much buffer space has been used to store media information or how much buffer space is available to store media information.

In a non-limiting exemplary scenario, where a user is consuming a second portion of formerly real-time media information that has been buffered, step 160 may comprise presenting an indication to the user that the user is presently consuming a portion of the real-time media information that is, for example, n seconds or m minutes old. As a non-limiting example, step 160 may comprise presenting a graphical indication notifying the user that the user is consuming media information that is older than the real-time media information currently being received.

Note that the above-mentioned user interface examples are merely exemplary and by no means meant to represent a limiting set of user interface characteristics. Accordingly, the scope of various aspects of the present invention should not be limited by characteristics of particular user interface features.

As discussed previously, while step 160 presents the second portion of the media information to the user, steps 170 and 180 may comprise receiving and buffering a third portion of the media information. Steps 170 and 180 may, for example and without limitation, share various characteristics with exemplary steps 140 and 150 discussed previously. For example, step 160 may comprise reading the second portion of the media information out of a media buffer, while steps 170 and 180 simultaneously receive and store the third portion of the media information in the media buffer.

The exemplary method 100 may, at step 195, comprise performing continued processing. Such continued processing may comprise characteristics of any of a variety of continued processing. For example and without limitation, step 195 may comprise presenting the buffered third portion of the media information to the user. Step 195 may also, for example, comprise providing media presentation control capability for the third portion similar to that discussed previously with regard to the first and second portions of the media information. Accordingly, the scope of various aspects of the present invention should not be limited by characteristics of any particular continued processing that may be performed.

The previous exemplary method 100 was presented to provide specific illustrations of various generally broader aspects of the present invention. Accordingly, the scope of various aspects of the present invention should not be limited by characteristics of the previously discussed exemplary method 100.

Figure 2:
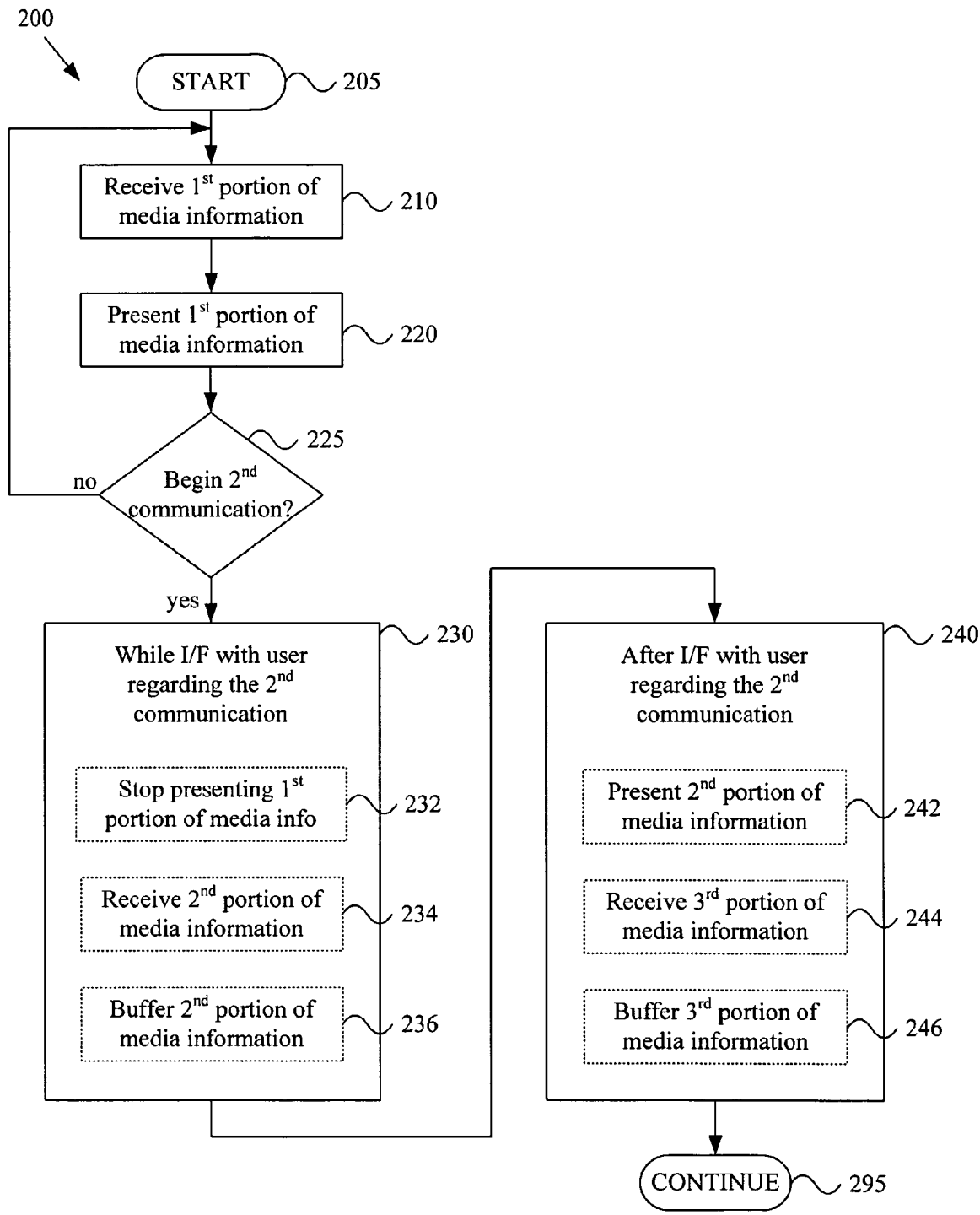
FIG. 2 is a diagram illustrating a method for presenting media information to a user of a mobile communication device, in accordance with various aspects of the present invention.

FIG. 2 is a diagram illustrating a method 200 for presenting media information to a user of a mobile communication device, in accordance with various aspects of the present invention. The exemplary method 200 may, for example and without limitation, share various characteristics with the exemplary method 100 illustrated in FIG. 1 and discussed previously.

The exemplary method 200 may, at step 210, comprise receiving a first portion of media information (e.g., a first portion of a unit of media information). The media information may, for example, correspond to a first communication. The exemplary method 200 may also, at step 220, comprise presenting the first portion of media information to a user. Exemplary steps 210 and 220 may, for example and without limitation, share various characteristics with steps 110 and 120 of the exemplary method 100 illustrated in FIG. 1 and discussed previously. Additionally, in a manner analogous to exemplary step 125 discussed previously, exemplary step 225 may comprise looping execution flow of the exemplary method 200 through steps 210 and 220 until a second communication begins.

Such a second communication may begin in any of a variety of manners. For example, such a second communication may begin automatically (e.g., without user interaction). Also for example, such a second communication may begin as a result of user interaction (e.g., the user indicating a desire to service an incoming phone call or message, make a phone call, receive a message, initiate a voice message, etc.). Accordingly, the scope of various aspects of the present invention should not be limited by any particular manner of beginning a second communication.

In a non-limiting exemplary scenario, the mobile communication device may be presenting media information to a user (e.g., at step 220) when an incoming communication arrives at the mobile communication device (e.g., a cellular phone call). Continuing the exemplary scenario, step 230 (or another step) may comprise providing the user with an indication of the incoming communication and provide the user with options for responding to the incoming communication. For example, the exemplary method 200 may comprise notifying the user of the incoming communication by providing a visible, audible and/or tactile indication. The user may then, for example, provide input to the mobile communication device to direct the mobile communication device in handling the incoming communication. For example the user may provide an input directing the mobile communication device to ignore the incoming communication, direct the incoming communication to a messaging function, or answer the incoming communication. A user input directing the mobile communication device to answer the incoming communication may, for example, initiate the functionality of step 230.

The exemplary method 200 may, at step 230, comprise interfacing with a user regarding a second communication. The second communication may, for example and without limitation, be unrelated to the first communication, including the media information being received and presented at steps 210 and 220. For example, the second communication may comprise a telephone communication, an e-mail communication or an instant message communication. Also for example, the second communication may comprise second media information (e.g., from a second media channel or from a different source than the first media information). The second communication may generally comprise characteristics of any of a variety of communication types (e.g., one-way, two-way or n-way communications).

As mentioned earlier, the second communication may, for example and without limitation, be independent of the first communication (i.e., the communication corresponding to the media information received at step 210). For example and without limitation, the first and second communications may occur with different communication systems, over different communication links, over different communication media, utilizing different communication protocols, etc.

Step 230 may comprise interfacing with a user regarding a second communication in any of a variety of manners. For example and without limitation, step 230 may comprise providing audio input and/or output to the user for conducting the second communication (e.g., a telephone communication, voice message, music presentation, etc.). Also for example, step 230 may comprise providing video input and/or output to the user for conducting the second communication (e.g., a videophone communication, video message, moving or still picture presentation, etc.).

In general, step 230 may comprise interfacing with a user regarding a second communication. Accordingly, the scope of various aspects of the present invention should not be limited by characteristics of any particular communication type, manner of effecting a communication, manner of interacting with another communication system, or manner of interacting with a user.

While step 230 comprises interfacing with the user regarding the second communication, the method 200 may, at step 232, comprise ceasing (or stopping) presentation of the first portion of the media information. Step 232 may, for example and without limitation, share various characteristics with exemplary step 130 of the exemplary method 100 illustrated in FIG. 1 and discussed previously.

Additionally, while step 230 comprises interfacing with the user regarding the second communication, the method 200 may, at steps 234 and 236, comprise receiving and buffering a second portion of the media information (e.g., a second portion of the unit of media information, a first portion of which was received and presented at steps 210 and 220). Steps 234 and 236 may, for example and without limitation, share various characteristics with steps 140 and 150 of the exemplary method 100 illustrated in FIG. 1 and discussed previously.

The method 200 may, at step 240, comprise completing interfacing with the user regarding the second communication. Step 240 may comprise completing such interfacing for any of a variety of reasons. For example and without limitation, step 240 may comprise receiving an indication that the second communication has completed and/or the user desires to resume consumption of the media information. Also for example, step 240 may comprise receiving an indication from another communication system involved with the second communication indicating that the second communication has completed. Further for example, step 240 may comprise determining that the second communication has ended (either properly or prematurely). Generally, step 240 may comprise completing interfacing with the user regarding the second communication. Accordingly, the scope of various aspects of the present invention should not be limited by any particular reason for completing such interfacing or any particular manner of completing such interfacing.

As step 240 completes interfacing with the user regarding the second communication (e.g., immediately or after a period of time that is automatically or manually determined), the method 200 may, at step 242, comprise presenting the second portion of the media information to the user. Step 242 may, for example and without limitation, share various characteristics with step 160 of the exemplary method 100 illustrated in FIG. 1 and discussed previously. For example and without limitation, step 242 may comprise providing fast-forward capability to the user. Also for example, step 242 may comprise retaining at least a portion of previously presented information in a buffer and providing rewind (or review) capability to the user.

Additionally, while presenting the second portion of the media information to the user (e.g., at step 242), the exemplary method 200 may, at steps 244 and 246, comprise receiving and buffering a third portion of media information (e.g., a third portion of the unit of video information). Steps 244 and 246 may, for example and without limitation, share various characteristics with steps 170 and 180 of the exemplary method 100 illustrated in FIG. 1 and discussed previously.

The exemplary method 200 may, at step 295, comprise performing continued processing. Such continued processing may comprise characteristics of any of a large variety of continued processing, some examples of which were discussed previously with regard to step 195 of the exemplary method 100 illustrated in FIG. 1.

The previous exemplary method 200 was presented to provide specific illustrations of various generally broader aspects of the present invention. Accordingly, the scope of various aspects of the present invention should not be limited to characteristics of the previously discussed exemplary method 200.

Figure 3:
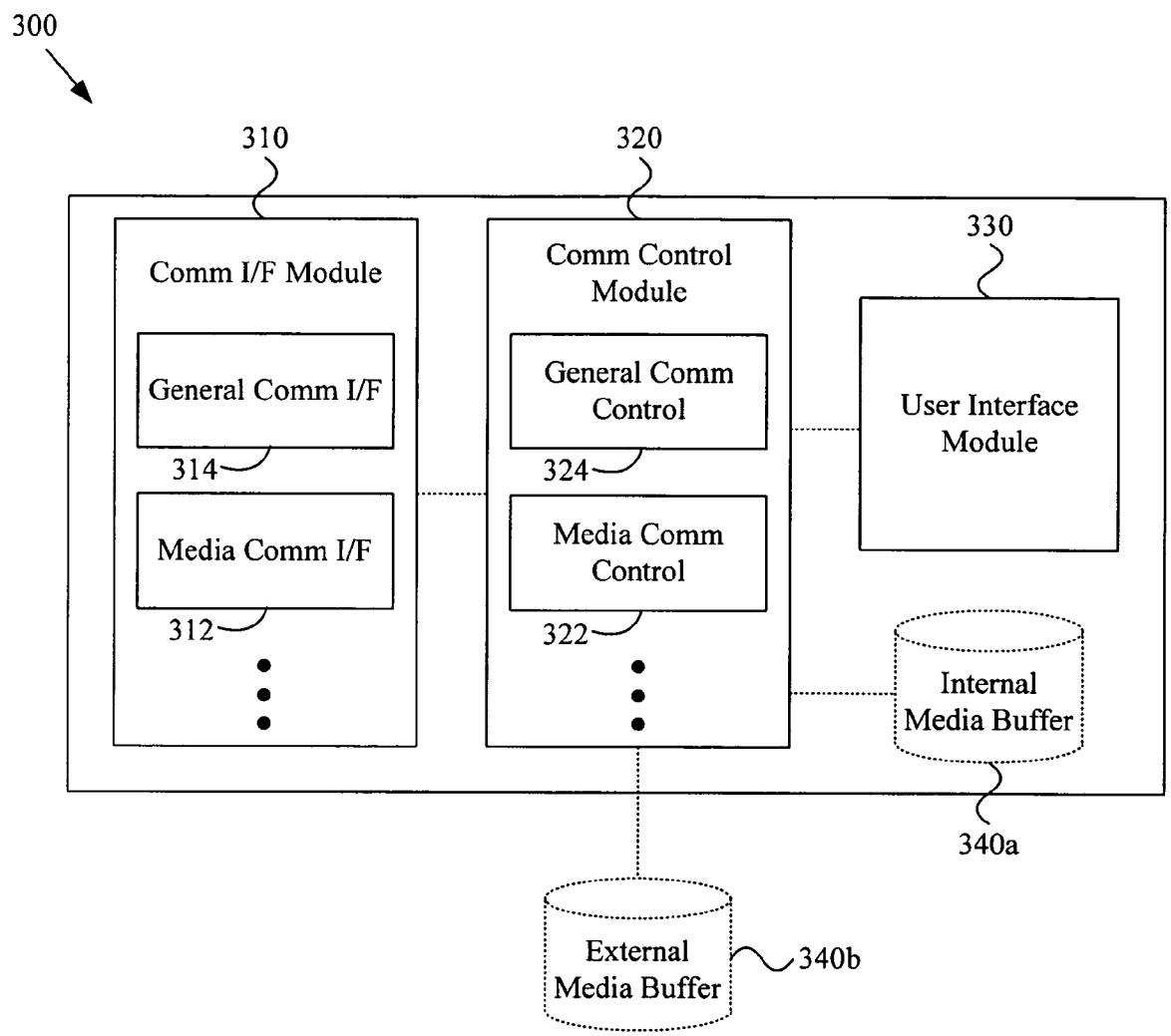
FIG. 3 is a block diagram of a mobile communication device that presents media information to a user of the mobile communication device, in accordance with various aspects of the present invention.

FIG. 3 is a block diagram of a mobile communication device 300 that presents media information to a user of the mobile communication device 300, in accordance with various aspects of the present invention. The mobile communication device 300 may, for example and without limitation, share various functional characteristics with the exemplary methods 100, 200 illustrated in FIGS. 1-2 and discussed previously.

The mobile communication device 300 may comprise characteristics of any of a variety of mobile communication devices. For example and without limitation, the mobile communication device 300 may comprise characteristics of a two-way communication device (e.g., a cellular telephone, mobile e-mail device, two-way pager, pocket computer with media communication and two-way communication capability, etc.). The scope of various aspects of the present invention should not be limited by characteristics of a particular type of mobile communication device.

As discussed previously, media information may comprise characteristics of any of a variety of types of information. For example and without limitation, media information may comprise multi-media, video, audio, textual, graphical, pictorial and other known types of information. Also for example, media information may comprise movie, television program, sporting event, gaming or music information. The term "media information" will be used in the following discussion to generally refer to any or all of such types of information.

The exemplary mobile communication device 300 may comprise a communication interface module 310 that generally manages and maintains one or more communication interfaces between the mobile communication device 300 and other communication systems. The communication interface module 310 may, for example, comprise a general communication interface module 314 that manages and/or maintains one or more general communication interfaces (or links) between the mobile communication device 300 and one or more other communication systems.

A general communication link may utilize any of a variety of communication media and any of a variety of communication protocols. For example and without limitation, a general communication link may comprise characteristics of a cellular telephone communication link, paging communication link or e-mail communication link. Also for example, a general communication link may comprise characteristics of a wired or wireless computer communication link. Further for example, a general communication link may comprise characteristics of a television, satellite or terrestrial telephone communication link.

In general, the general communication interface module 314 may manage and/or maintain any of a variety of communication links. Accordingly, the scope of various aspects of the present invention should not be limited by characteristics of a particular type of communication link or manner of maintaining or managing a particular type of communication link.

The communication interface module 310 may comprise a media communication interface module 312 that manages and/or maintains one or more media communication interfaces (or links) between the mobile communication device 300 and one or more other communication systems that communicate media information to (and/or from) the mobile communication device 300. The media communication interface module 312 may, for example and without limitation, share various characteristics with the general communication interface module 314 discussed previously. For example and without limitation, the media communication interface module 312 may comprise the capability to manage or maintain any general communication link.

A media communication link may generally comprise a communication link that is adapted to communicate media information to (and/or from) the mobile communication device 300. As mentioned previously, the media information may comprise any of a variety of media, including but not limited to, video, graphical, audio, pictorial or textual media. A media communication link may utilize any of a variety of communication media and any of a variety of communication protocols or techniques to communicate such media information (e.g., video and/or audio streaming). Accordingly, the scope of various aspects of the present invention should not be limited by characteristics of any particular media, any particular manner of communicating such media information, or any particular manner of managing or maintaining media communication links that communicate such media information.

The exemplary mobile communication device 300 may comprise a user interface module 330 that generally provides an interface between the mobile communication device 300 and the user. The user interface module 330 may comprise any of a variety of user interface devices. For example and without limitation, the user interface module 330 may comprise a video display, audio speaker, microphone, moving or still picture camera, keypad, touch pad, etc. In general, the user interface module 330 provides an interface between the mobile communication device 300 and a user. Accordingly, the scope of various aspects of the present invention should not be limited by characteristics of a particular user interface device or module.

The exemplary mobile communication device 320 may comprise a communication control module 320 that generally governs (or manages) operation of the mobile communication device 300 (e.g., in various modes of operation). The communication control module 320 may comprise a general communication control module 324 that, for example, manages operation of the mobile communication device 300 performing general communication. Such general communication may, for example and without limitation, comprise general cellular telephone communication. Such general communication may also, for example, comprise messaging or email communication. In a non-limiting exemplary scenario, the general communication module 324 may comprise managing the flow of information between the general communication interface module 314 and the user interface module 330.

The communication control module 320 may also comprise a media communication control module 322 that generally governs (or manages) operation of the mobile communication device 300 (e.g., in various media communication modes) during media communication. The media communication control module 322 may, for example, manage operation of the mobile communication device 300 receiving and presenting any of a variety of media information to a user (e.g., video, audio, graphical, pictorial or textual media information). The media communication control module 322 may generally perform various functional aspects of the exemplary methods 100, 200 illustrated in FIGS. 1-2 and discussed previously.

In a non-limiting exemplary scenario, the media communication control module 322 may manage the flow of media information between the media communication interface module 312 and the user interface module 330. In another non-limiting exemplary scenario, the media communication control module 322 may comprise directing media information to and from an internal media buffer 340a and/or an external media buffer 340b. Such operation will be illustrated later by way of non-limiting examples.

In general, the communication control module 320 may generally govern operation of the mobile communication device 300. Accordingly, the scope of various aspects of the present invention should not be limited by characteristics of any particular manner of controlling operation of a mobile communication device.

As mentioned previously, the exemplary mobile communication device 300 may comprise any of a variety of buffer types. For example, the mobile communication device 300 may comprise an internal media buffer 340a and/or an external media buffer 340b. A media buffer may comprise characteristics of any of a variety of memory types. For example and without limitation, a media buffer may comprise characteristics of a hard drive, mini hard drive, removable memory module or stick, on-board fixed non-volatile memory, etc. The external media buffer 340b may, for example, be communicatively coupled to the mobile communication device 300 through any of a variety of communication media and/or protocols. Accordingly, the scope of various aspects of the present invention should not be limited by characteristics of any particular memory device or memory type.

The following discussion will discuss general operation of portions of the mobile communication device 300 by way of non-limiting illustrative exemplary scenarios. It should be understood that the following exemplary scenarios are non-limiting, and as such, should not limit the scope of various aspects of the present invention.

In the first non-limiting exemplary scenario, the mobile communication device 300 (e.g., utilizing the media communication interface module 312) may receive a first portion of media information (e.g., a first portion of a unit of media information). The mobile communication device 300 (e.g., utilizing the media communication interface module 312) may share various functional characteristics with step 110 of the exemplary method 100 illustrated in FIG. 1 and discussed previously.

As discussed previously, a "unit of media information" may, for example and without limitation, comprise a television program, a song, a slideshow, a movie, a music video, televised or radio-broadcast sporting event, an audio newscast, a stock ticker, etc. The media communication interface module 312 may receive the media information in any of a variety of manners (e.g., receiving media broadcast, multicast, unicast, streaming, etc.). The media communication interface module 312 may receive the media information over any of a variety of communication media and utilizing any of a variety of communication protocols. For example and without limitation, the media communication interface module 312 may receive the media information over a wireless RF medium and utilizing a cellular telephony communication protocol. Also, for example, the media communication interface module 312 may receive the media information through a wired, tethered optical or non-tethered optical medium, and utilizing any of a large variety of wired, wireless or optical communication protocols that are presently known or to be developed. In general, the mobile communication device 300 (e.g., utilizing the media communication interface module 312) may receive a first portion of media information (e.g., a first portion of a unit of media information). Accordingly, the scope of various aspects of the present invention should not be limited by characteristics of any particular manner of, or mechanism for, receiving media information.

Continuing the first non-limiting exemplary scenario, the mobile communication device 300 may also present the first portion of the unit of media information (e.g., as received by the media communication I/F module 312) to a user (e.g., utilizing the user interface module 330). The mobile communication device 300 (e.g., the media communication control module 322 and the user interface module 330) may share various functional characteristics with step 120 of the exemplary method illustrated in FIG. 1 and discussed previously.

For example, the media communication control module 322 may utilize the user interface module 330 to present the first portion of the media information to a user in any of a variety of manners. For example and without limitation, the media communication control module 322 may utilize the user interface module 330 to present the first portion of the media information to a user utilizing a video display, speaker, etc. The media communication control module 322 may also, for example, utilize the user interface module 330 to provide the user with various mechanisms (e.g., various display and audio control mechanisms) for controlling the presentation of the first portion of the media information to the user. In general, the mobile communication device 300 may (e.g., utilizing the media communication control module 322 and the user interface module 330) present the first portion of the unit of media information to a user. Accordingly, the scope of various aspects of the present invention should not be limited by any particular manner of, or mechanism for, presenting media information to a user.

The mobile communication device 300 may, for example, receive and present the first portion of the media information until the mobile communication device 300 receives a first signal. Such a first signal may, for example, be representative of a user input to the mobile communication device 300 (e.g., obtained by the user interface module 330). For example and without limitation, the first signal may result from a user input indicative of the user desiring to respond to an incoming communication or generate an initial outgoing communication. Also for example, the first signal may result from a user input indicative of the user desiring to change the manner in which a unit of media information is being presented to the user by the mobile communication device 300. For example, the first signal may be indicative of the user desiring to (at least temporarily) pause presentation of media information.

Alternatively, for example, the first signal may originate at another communication system (or be indicative of a signal originating at another communication system). The mobile communication device 300 may, for example, receive such a signal with the general communication interface module 314 (or alternatively, the media communication interface module 312). For example and without limitation, the first signal may originate at a remote communication system that is attempting to communicate with the mobile communication device 300 (e.g., with the user). For example, in this scenario, the first signal may comprise a signal indicative of an incoming telephone call, videophone call, instant text message or email message. In general, the first signal may comprise any of a variety of signal characteristics and may originate at any of a variety of sources. Accordingly, the scope of various aspects of the present invention should not be limited by characteristics of any particular signal or any particular manner of, or mechanism for, receiving such a signal.

In response to receiving the first signal, the mobile communication device 300 may, for example, cease presenting the first portion of the media information to the user (e.g., utilizing the media communication control module 322 and the user interface module 330). The mobile communication device 300 may, for example, cease presentation of the first portion of the media information in any of a variety of manners, which may depend on the type of media information being presented. For example and without limitation, the media communication control module 322 may direct the user interface module 330 to blank a video output screen or present a display-saver image, silence an audio output speaker, freeze an image on a video output screen, etc.

Also for example, the mobile communication device 300 may (e.g., utilizing the user interface module 330) output a user interface indication on a video output screen that is related to the received first signal. As a non-limiting example, the communication control module 320 may utilize the user interface module 330 to present the user with options concerning how to handle an incoming communication. As another non-limiting example, the communication control module 320 may utilize the user interface module 330 to present the user with options concerning how to resume presentation of the media information. As still another non-limiting example, the communication control module 320 may utilize the user interface module 330 to present the user with options for executing any of a variety of functionality provided by the mobile communication device 300.

In general, the mobile communication device 300 may, for example in response to receiving a first signal, cease presentation of the first portion of the media information. Accordingly, the scope of various aspects of the present invention should not be limited by characteristics of any particular manner of, or mechanism for, ceasing such presentation or by characteristics of any additional related user interface capability that may be provided.

Continuing the first non-limiting exemplary scenario, while presentation of the first portion of the media information has ceased, the mobile communication device 300 (e.g., utilizing the media communication interface module 312) may receive a second portion of the media information (e.g., a second portion of the unit of media information). The mobile communication device 300 may, for example and without limitation, share various characteristics with step 140 of the exemplary method 100 illustrated in FIG. 1 and discussed previously.

As discussed previously, for example and without limitation, a second portion of the media information may comprise a second portion of a television program or period of television programming, a song, a slideshow, a movie, a music video, a televised or radio-broadcast sporting event, an audio newscast, a stock ticker, etc., where the first portion was received and presented previously in the this first exemplary scenario. As with receiving the first portion of the media information, the mobile communication device 300 may receive the second portion of media information in any of a variety of manners (e.g., receiving media broadcast, multicast, unicast, streaming, etc.), which may, for example but not necessarily, comprise the same manner in which the first portion of the media information was previously received. Also, the mobile communication device 300 (e.g., utilizing the media communication interface module 312) may, for example, receive the second portion of the media information over any of a variety of communication media and utilizing any of a variety of communication protocols. In general, the mobile communication device 300 may receive a second portion of media information (e.g., a second portion of the unit of media information). Accordingly, the scope of various aspects of the present invention should not be limited by characteristics of any particular manner of, or mechanism for, receiving media information.

Continuing the first non-limiting exemplary scenario, the mobile communication device 300 (e.g., the media communication control module 322) may buffer the received second portion of media information. The mobile communication device 300 (e.g., the media communication control module 322 and/or media buffer(s) 340) may, for example and without limitation, share various functional characteristics with step 150 of the exemplary method 100 illustrated in FIG. 1 and discussed previously. The mobile communication device 300 may buffer the second portion of the media information (e.g., a second portion of the unit of information) in any of a variety of manners.

For example and without limitation, the media communication control module 322 may store the media information in a buffer (e.g., an internal media buffer 340a and/or an external media buffer 340b) until the buffer is full, only storing media information that has not already been presented to the user, and then stop storing new media information when the buffer becomes full. Alternatively, for example, the media communication control module 322 may store the media information in a buffer until the buffer is full and then continue storing the media in a rolling manner, replacing the oldest media information with the newest media information. Also for example, the media communication control module 322 may store the media information in a local memory until the local memory has reached a particular state of fullness and then store additional media information in a removable memory (e.g., a storage card, memory stick, etc.). The scope of various aspects of the present invention should not be limited by characteristics of any particular manner of storing media information.

The mobile communication device 300 (e.g., the media communication control module 322 in conjunction with a compression module) may, for example and without limitation, perform various acts of compression on the stored media information. For example and without limitation, the mobile communication device 300 may utilize a compression module to spatially and/or temporally compress buffered media information. In such an example, the mobile communication device 300 may trade off later media presentation quality for buffer space, for example, ensuring that the user may at least consume the media information at a relatively coarse level, versus consuming a first segment of the media information at a relatively fine level but completely missing a second segment of the media information. Also for example, the mobile communication device 300 may also modify the level of compression according to remaining buffer capacity (e.g., performing relatively little or no compression when a relatively high amount of buffer capacity remains and performing relatively high compression when a relatively low amount of buffer capacity remains). Also for example, the mobile communication device 300 may compress or re-compress media information that has already been buffered to make room in the buffer space for additional media information. The scope of various aspects of the present invention should not be limited by the existence of compression or by characteristics of any particular manner of, or mechanism for, compressing media information.

The mobile communication device 300 (e.g., the media communication control module 322) may buffer the second portion of the media information in any of a variety of media buffer (or memory) types. For example and without limitation, the mobile communication device 300 may buffer the media information in an internal media buffer 340a (e.g., on-board memory chip or a local disk drive). Also for example, the mobile communication device 300 may buffer the media information in a removable memory (e.g., a removable memory module, card, or stick). Further for example, the mobile communication device 300 may buffer the media information in a memory device that is external to the mobile communication device 300 and communicatively coupled (e.g., coupled by wire, wirelessly coupled or optically coupled) to the mobile communication device 300. The scope of various aspects of the present invention should not be limited by characteristics of a particular type of buffer memory device.

Continuing the first non-limiting exemplary scenario, the mobile communication device 300 may, for example, receive and buffer the second portion of the unit of media information until a second signal is received. For example and without limitation, the mobile communication device 300 may share various functional characteristics with step 155 of the exemplary method 100 illustrated in FIG. 1 and discussed previously.

The second signal may comprise any of a variety of characteristics. For example and without limitation, the second signal may be representative of a user input indicative of the user ending a communication (e.g., ending a phone call, completing transmission of a message, etc.) or other function (e.g., making a notebook entry, finishing a game, etc.). The user interface module 330 may, for example, receive such user input from the user. Also for example, the second signal may result from a user input indicative of the user desiring to change the manner in which a unit of media information is being presented to the user by the mobile communication device. For example, the second signal may be indicative of the user desiring to resume normal presentation of media information, the presentation of which was previously altered (e.g., paused).

Alternatively, for example, the second signal may originate at a remote source (e.g., a remote communication system). The general communication interface module 314 (or the media communication interface module 312) may, for example, receive such input from the remote source. For example and without limitation, the second signal may originate at a remote communication system that is completing communication with the mobile communication device 300 (e.g., indicating that the remote communication system has completed communicating with the mobile communication device 300). In general, the second signal may comprise any of a variety of signal characteristics and may originate at any of a variety of sources. Accordingly, the scope of various aspects of the present invention should not be limited by characteristics of any particular signal.

After receiving the second signal, the mobile communication device 300 may present the second portion of the media information (e.g., a second portion of the unit of media information, the first portion of which was presented previously) to the user. The mobile communication device 300 may, for example and without limitation, share various functional characteristics with step 160 of the exemplary method 100 illustrated in FIG. 1 and discussed previously. The mobile communication device 300 may present the second portion of the media information to the user in any of a variety of manners (e.g., utilizing the media communication control module 322 and the user interface module 330). For example and without limitation, the mobile communication device 300 may present the second portion of the media information in a manner similar to the first portion of the media information.

Continuing the first non-limiting exemplary scenario, in presenting the second portion of the media information (e.g., a second portion of the unit of media information) to the user, the mobile communication device 300 may, for example, provide media presentation control features to the user at a user interface. For example and without limitation, the mobile communication device 300 (e.g., the media communication control module 322 in conjunction with the user interface module 330) may provide the user the ability to specify presentation of the second portion of the media information in fast-forward mode.

In a non-limiting example, the second portion of the media information may temporally lead a third portion of the media information. In other words, the user may be consuming media information (e.g., the second portion) that is temporally earlier than media information arriving in real-time (e.g., a third portion), which the mobile communication device 300 may be receiving and buffering while the user is consuming the temporally-earlier second portion of the media information. The user may, for example, specify a fast-forward mode to expeditiously consume the second portion of the media information, which would allow the user to catch up to real-time presentation of the media information.

Further for example, the mobile communication device 300 may provide a rewind (or review) capability to the user. For example and without limitation, the mobile communication device 300 (e.g., the media communication control module 322) may retain a particular amount of previously-presented media information in a media buffer (e.g., media buffer 340a or 340b) and provide a user interface (e.g., with the user interface module 330) allowing the user to specify rewinding or reviewing such media information. Also for example, the mobile communication device 300 may provide the user the capability to consume the media information in any manner that media information is generally consumed (e.g., trick play and/or normal play capability, including pause, slow-motion, forward and reverse at various speeds, etc.).

As another example of user interface capability, the mobile communication device 300 (e.g., the media communication control module 322) may provide to the user an indication of the state of fullness of a media buffer (e.g., utilizing the user interface module 330). For example, the mobile communication device 300 may provide a visual indication on an output display that notifies the user how much information is stored in the media buffer (e.g., an internal media buffer 340a and/or an external media buffer 340b). Also for example, the mobile communication device 300 may provide an audible indication that notifies the user how much information is stored in the media buffer (e.g., a warning that the buffer is at a particular state of fullness). The mobile communication device 300 may, for example, provide an indication notifying the user how much buffer space has been used to store media information or how much buffer space is available to store media information.

As a non-limiting example, where a user is consuming a second portion of formerly real-time media information that has been buffered, the mobile communication device 300 may present an indication to the user that the user is presently consuming a portion of the real-time media information that is, for example, n seconds or m minutes old. For example, the mobile communication device 300 may utilize the user interface module 330 to present a graphical indication notifying the user that the user is consuming media information that is older than the real-time media information currently being received.

Note that the above-mentioned user interface examples are merely exemplary and by no means meant to represent a limiting set of user interface characteristics. Accordingly, the scope of various aspects of the present invention should not be limited by characteristics of particular user interface features.

As discussed previously, while the mobile communication device 300 presents the second portion of the media information to the user, the mobile communication device 300 may receive and buffer a third portion of the media information. The mobile communication device 300 may, for example and without limitation, share various functional characteristics with steps 170 and 180 of the exemplary method 100 illustrated in FIG. 1 and discussed previously. The mobile communication device 300 may, for example, handle such a third portion of the media information in a manner similar to the second portion of the media information discussed previously. For example, the mobile communication device 300 (e.g., the media communication control module 322) may read the second portion of the media information out of a media buffer, while the mobile communication device 300 simultaneously receives and stores the third portion of the media information in the media buffer.

The first non-limiting exemplary scenario involving the mobile communication device 300 was presented to provide specific illustrations of various generally broader aspects of the present invention. Accordingly, the scope of various aspects of the present invention should not be limited by characteristics of the first non-limiting exemplary scenario.

The following discussion will now illustrate general operation of portions of the mobile communication device 300 by way of a second non-limiting exemplary scenario. It should be understood that the following exemplary scenario is non-limiting, and as such, should not limit the scope of various aspects of the present invention. In the second non-limiting exemplary scenario, the mobile communication device 300 may function generally in accordance with the exemplary method 200 illustrated in FIG. 2 and discussed previously.

The mobile communication device 300 may, for example, receive a first portion of media information (e.g., a first portion of a unit of media information). The media information may, for example, correspond to a first communication. The mobile communication device 300 may also, for example, present the first portion of media information to a user. The mobile communication device 300 may, for example and without limitation, share various characteristics with steps 210 and 220 of the exemplary method 200 illustrated in FIG. 2 and discussed previously. Additionally, in a manner analogous to exemplary step 225 discussed previously, the mobile communication device 300 may perform such receiving and presenting until a second communication begins.

Such a second communication may begin in any of a variety of manners. For example, such a second communication may begin automatically (e.g., without user interaction). Also for example, such a second communication may begin as a result of user interaction (e.g., the user indicating a desire to service an incoming phone call or message, make a phone call, receive a message, initiate a voice message, etc.). The mobile communication device 300 may, for example, perform such a user interaction using the user interface module 330. The scope of various aspects of the present invention should not be limited by any particular manner of beginning a second communication.

Continuing the second non-limiting exemplary scenario, the mobile communication device 300 may interface with the user regarding the second communication. For example the general communication control module 324 may utilize the user interface module 330 to interface with the user. The second communication may, for example and without limitation, be unrelated to the first communication, including the first portion of media information being received and pre-sented when the second communication began. For example, the second communication may comprise a telephone communication, an e-mail communication or an instant message communication. Also for example, the second communication may comprise second media information (e.g., from a second media channel or from a different source than the first media information). The second communication may generally comprise characteristics of any of a variety of communication types (e.g., one-way, two-way or n-way communications).

As mentioned earlier, the second communication may, for example and without limitation, be independent of the first communication (i.e., the communication corresponding to the first portion of the media information received previously). For example and without limitation, the first and second communications may occur with different communication systems, over different communication links, over different communication media, utilizing different communication protocols, etc.

The mobile communication device 300 may interface with a user regarding a second communication in any of a variety of manners. For example and without limitation, the general communication control module 324 may utilize the user interface module 330 to provide audio input and/or output to the user for conducting the second communication (e.g., a telephone communication, voice message, music presentation, etc.). Also for example, the general communication control module 324 may utilize the user interface module 330 to provide video input and/or output to the user for conducting the second communication (e.g., a videophone communication, video message, moving or still picture presentation, etc.).

In general, the mobile communication device 300 may interface with a user regarding a second communication. Accordingly, the scope of various aspects of the present invention should not be limited by characteristics of any particular communication type, manner of effecting a communication, manner of interacting with another communication system, or manner of interacting with a user.

Continuing the second non-limiting exemplary scenario, while the mobile communication device 300 interfaces with the user regarding the second communication, the mobile communication device 300 may stop presenting the first portion of the media information. The mobile communication device 300 may, for example and without limitation, share various functional characteristics with step 232 of the exemplary method 200 illustrated in FIG. 2 and discussed previously.

Additionally, while the mobile communication device 300 interfaces with the user regarding the second communication, the mobile communication device 300 may also receive and buffer a second portion of the media information (e.g., a second portion of the unit of media information, a first portion of which was received and presented previously). The mobile communication device 300 may, for example and without limitation, share various functional characteristics with steps 234 and 236 of the exemplary method 200 illustrated in FIG. 2 and discussed previously. For example, the media communication interface module 312 may receive the second portion of the media information and provide such information to the media communication control module 322, which stores the second portion of the media information in a media buffer (e.g., an internal media buffer 340a and/or an external media buffer 340b).

Continuing the second non-limiting exemplary scenario, the mobile communication device 300 may eventually complete interfacing with the user regarding the second communication. The mobile communication device 300 may complete such interfacing for any of a variety of reasons. For example and without limitation, the mobile communication device 300 may receive (e.g., at the user interface module 330) an indication that the second communication has completed and/or the user desires to resume consumption of the media information. Also for example, the mobile communication device 300 may receive an indication from another communication system involved with the second communication (e.g., utilizing the general communication interface module 314) indicating that the second communication has completed. Further for example, the mobile communication device 300 may determine that the second communication has ended (either properly or prematurely). Generally, the mobile communication device 300 may complete interfacing with the user regarding the second communication. Accordingly, the scope of various aspects of the present invention should not be limited by any particular reason for completing such interfacing or any particular manner of completing such interfacing.

Continuing the second non-limiting exemplary scenario, after the mobile communication device 300 completes interfacing with the user regarding the second communication (e.g., immediately or after a period of time that is automatically or manually determined), the mobile communication device 300 may present the second portion of the media information to the user. The mobile communication device 300 may, for example and without limitation, share various characteristics with step 242 of the exemplary method 200 illustrated in FIG. 2 and discussed previously. For example, the media communication control module 322 may retrieve the second portion of the media information from a media buffer (e.g., an internal media buffer 340*a* and/or an external media buffer 340*b*) and utilize the user interface module 330 to present the second portion of the media information to the user.

As in the first non-limiting exemplary scenario, the mobile communication device 300 may provide fast-forward capability to the user. Also for example, the mobile communication device 300 may retain at least a portion of previously-presented media information in a buffer (e.g., an internal media buffer 340*a* and/or an external media buffer 340*a*) and provide rewind (or review) capability to the user.

Continuing the second non-limiting exemplary scenario, while presenting the second portion of the media information to the user, the mobile communication device 300 may receive and buffer a third portion of media information (e.g., a third portion of the unit of video information). The mobile communication device 300 may, for example and without limitation, share various functional characteristics with steps 244 and 246 of the exemplary method 200 illustrated in FIG. 2 and discussed previously. The mobile communication device 300 may, for example, receive and buffer the third portion of the media information in a manner similar to the second portion of the media information received and buffered previously.

The second non-limiting exemplary scenario was presented to provide specific illustrations of various generally broader aspects of the present invention. Accordingly, the scope of various aspects of the present invention should not be limited by characteristics of the second non-limiting exemplary scenario.

Figure 4:
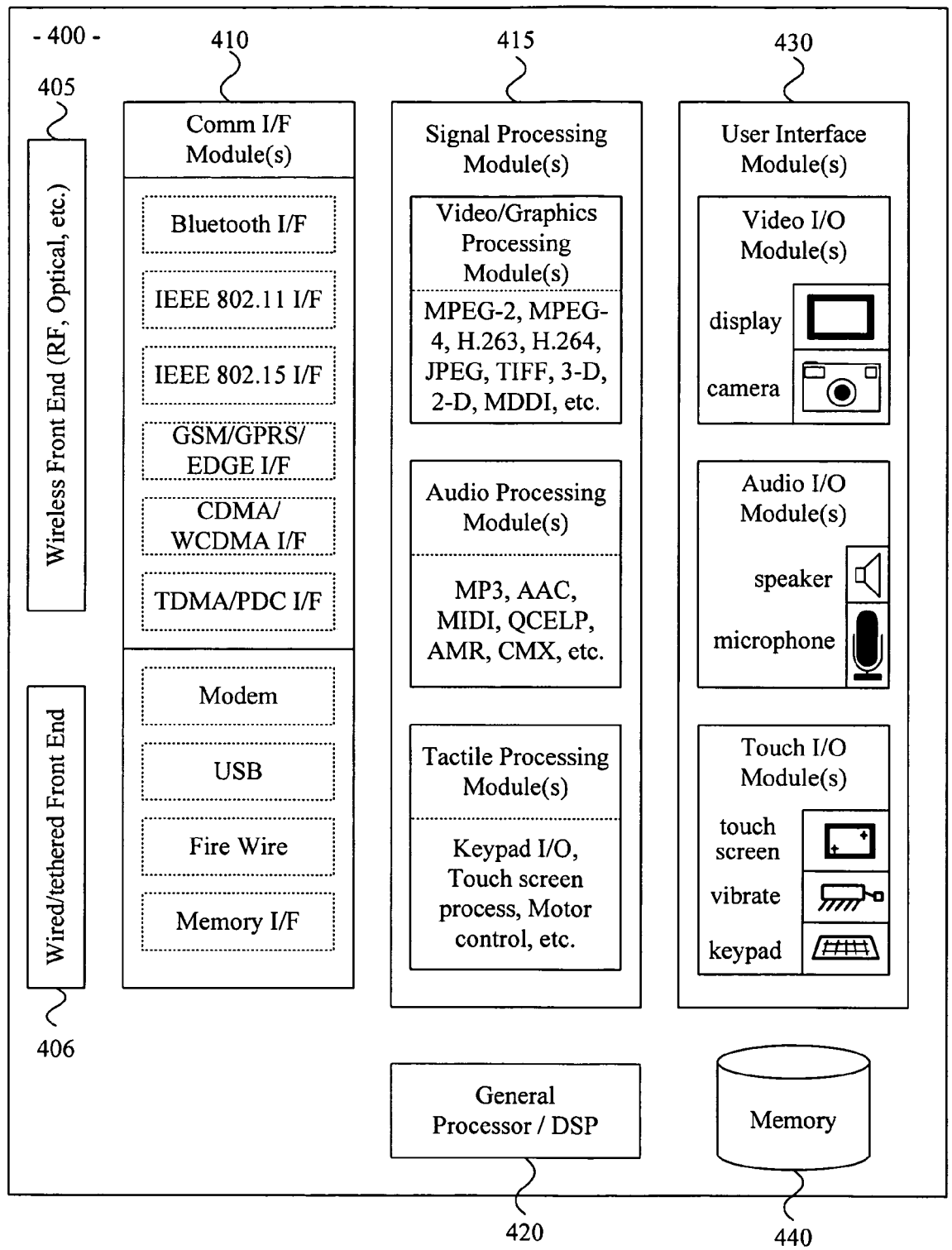
FIG. 4 is a block diagram of a cellular phone that presents media information to a user of the mobile cellular phone, in accordance with various aspects of the present invention.

FIG. 4 is a block diagram of a cellular phone 400 that presents media information to a user of the cellular phone 400, in accordance with various aspects of the present invention. The cellular phone 400 may, for example and without limitation, share various characteristics with the exemplary mobile communication device 300 illustrated in FIG. 3 and discussed previously. Further for example, the cellular phone 400 may share various functional characteristics with the exemplary methods 100, 200 illustrated in FIGS. 1-2 and discussed previously.

The exemplary cellular phone 400 may comprise a wireless front end 405 and/or a wired/tethered front end 406. The wireless front end 405 and the wired/tethered front end 406 may be communicatively coupled to any of a variety of communication interface modules 410. The exemplary cellular phone 400 is illustrated with a non-limiting exemplary set of communication interface modules 410, including: a Bluetooth interface module, IEEE 802.11 interface module, IEEE 802.15 interface module, GSM/GPRS/EDGE interface module, CDMA/WCDMA interface module, TDMA/PDC interface module, modem module, USB module, fire wire module and memory interface module (e.g., for interfacing with off-board or removable memory). The wireless front end 405, wired/tethered front end 406 and communication interface modules 410 may, for example and without limitation, share various characteristics with the communication interface module(s) 310 (e.g., including the general communication interface module 314 and the media communication interface module 312) of the exemplary portable communication device 300 illustrated in FIG. 3 and discussed previously.

The exemplary cellular phone 400 may also comprise any of a variety of user interface modules 430. The user interface modules 430 may, for example and without limitation, share various characteristics with the user interface module 330 of the exemplary system 300 illustrated in FIG. 3 and discussed previously. The exemplary cellular phone 400 is illustrated with a non-limiting exemplary set of user interface modules 430 (or sub-modules). The user interface modules 430 may, for example, comprise any of a variety of video/graphics processing modules, audio processing modules, and tactile signal processing modules. The cellular phone 400 may also comprise compatible user interface devices corresponding to the various user interface modules 430 (e.g., a video display, camera, speaker, microphone, touch screen, keypad, vibrator, etc.).

The exemplary cellular phone 400 is illustrated with a non-limiting exemplary set of signal processing modules 415, which may be selectively utilized in accordance with current signal processing needs. The signal processing modules 415 may, for example, comprise various video, audio, textual and tactile signal processing modules. The signal processing modules 415 may generally, for example, process information conveyed between the front ends 405, 406 and communication interface module(s) 410 of the cellular phone 400 and the user interface 430 of the cellular phone 400.

The exemplary cellular phone 400 may also comprise a general processor 420 (and/or a digital signal processor) and on-board memory 440. The general processor 420, which may be a baseband processor for example, and memory 440 may perform any of a wide variety of operational tasks for the cellular phone 400. For example and without limitation, the general processor 420 and memory 440 may share various characteristics with the communication control module(s) 320 and media buffer(s) 340 of the exemplary system 300 illustrated in FIG. 3 and discussed previously.

It should be noted that various modules of the previously discussed exemplary mobile communication device 300 and cellular phone 400 may be implemented in hardware, software, or a combination thereof. Also, various modules may share portions of hardware and software. For example, a first and second module may share one or more hardware components and/or one or more software routines. Accordingly, the scope of various aspects of the present invention should not be limited by any particular hardware or software implementation of the various modules or by arbitrary hardware and software boundaries between the various modules.

Further, the various modules of the exemplary mobile communication device 300 and cellular phone 400 may be implemented in various degrees of integration. For example and without limitation, the modules may all be integrated on a single chip. Also for example, the various modules may be implemented in separate chips of a single circuit board. Accordingly, the scope of various aspects of the present invention should not be limited by characteristics of any particular implementation or level of integration of the various exemplary modules.

The previous exemplary illustrations were generally directed to media receiving, processing, storing and presenting. As mentioned previously, and as stressed again here, such media may comprise characteristics of any of a variety of media types, including without limitation, multi-media, video, audio, textual, graphical, pictorial, and other known types of media information. Accordingly, the scope of various aspects of the present invention should not be limited by characteristics of any particular type of media information, or any particular methods and components for controlling, processing and presenting such information.

In summary, various aspects of the present invention provide a system and method for presenting media information to a user of a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a mobile communication device, a method for presenting media information to a user, the method comprising:
   receiving media information in a first communication and presenting the received media information to the user;
   while receiving the media information and presenting the received media information to the user, receiving a signal related to initiation of a second communication unrelated to the first communication; and
   in response to the received signal related to initiation of the second communication:
      continuing receiving media information in the first communication, comprising receiving a next portion of the media information; and
      buffering the received next portion of the media information in a local memory device of the mobile communication device and in a memory device external to the mobile communication device.

2. The method of claim 1, wherein the received signal is representative of a user input to the mobile communication device.

3. The method of claim 1, wherein the received signal is received from a communication system external to the mobile communication device.

4. The method of claim 1, comprising, in response to the received signal, ceasing presenting the received media information to the user.

5. The method of claim 1, comprising:
   receiving a second signal related to ending the second communication; and
   in response to the received second signal, presenting the buffered next portion of the media information to the user.

6. The method of claim 5, comprising, while presenting the buffered next portion of the media information to the user, receiving and buffering a further portion of the media information.

7. The method of claim 5, comprising, while presenting the buffered next portion of the media information to the user, providing fast-forward capability to the user.

8. The method of claim 5, comprising, while presenting the buffered next portion of the media information to the user, providing rewind capability to the user.

9. The method of claim 1, comprising outputting the age of media information that is currently being presented to the user.

10. The method of claim 1, wherein buffering the received next portion of the media information comprises:
    initially storing the next portion of the media information in a local memory device of the mobile communication device; and
    when the local memory device reaches a particular level of fullness, storing the next portion of the media information in a removable memory module inserted into the mobile communication device.

11. The method of claim 1, wherein buffering the received next portion of the media information comprises buffering the received next portion of the media information in a temporally rolling manner comprising replacing the oldest buffered media information with the newest buffered media information.

12. In a mobile communication device, a method for presenting media information to a user, the method comprising:
    receiving media information in a first communication;
    presenting the received media information to a user;
    while presenting the received media information to the user, beginning a second communication that is unrelated to the first communication;
    while interfacing with the user regarding the second communication:
       continuing receiving media information in the first communication, comprising receiving a next portion of the media information; and
       buffering the received next portion of the media information in a local memory device of the mobile communication device and in a memory device external to the mobile communication device;
    after interfacing with the user regarding the second communication, presenting the buffered next portion of the media information to the user; and
    while presenting the buffered next portion of the media information to the user, retaining at least some of the buffered next portion in an on-chip memory buffer after presenting the at least some of the buffered next portion to the user.

13. The method of claim 12, comprising, while presenting the buffered next portion of the media information to the user, receiving and buffering a further portion of the media information.

14. The method of claim 12, comprising, while presenting the buffered next portion of the media information to the user, providing fast-forward capability to the user.

15. The method of claim 12, wherein buffering the received next portion of the media information comprises buffering the received next portion of the media information in a temporally rolling manner comprising replacing the oldest buffered media information with the newest buffered media information.

16. The method of claim 12, comprising retaining a set amount of the buffered media information after presentation of said set amount to the user.

17. The method of claim 12, comprising, prior to receiving and buffering the next portion of the media information, receiving an indication from the user to perform the second communication.

18. A mobile communication device, comprising:
at least one module operable to, at least:
receive media information in a first communication and present the received media information to a user;
while receiving the media information and presenting the received media information to the user, receive a signal related to initiation of a second communication unrelated to the first communication; and
in response to the received signal related to initiation of the second communication:
continue to receive media information in the first communication by, at least in part, operating to receive a next portion of the media information; and
buffer the received next portion of the media information in a local memory device of the mobile communication device and in a memory device external to the mobile communication device.

19. The mobile communication device of claim 18, where the received signal is representative of a user input to the mobile communication device.

20. The mobile communication device of claim 18, where the received signal is received from a communication system external to the mobile communication device.

21. The mobile communication device of claim 18, wherein the at least one module is operable to cease presenting the received media information to the user in response to the received signal.

22. The mobile communication device of claim 18, wherein the at least one module is operable to:
receive a second signal related to ending the second communication; and
in response to the received second signal, present the buffered next portion of the media information to the user.

23. The mobile communication device of claim 22, wherein the at least one module is operable to, while the buffered next portion of the media information is presented to the user, receive and buffer a further portion of the media information.

24. The mobile communication device of claim 22, wherein the at least one module is operable to, while the buffered next portion of the media information is presented to the user, provide fast-forward capability to the user.

25. The mobile communication device of claim 22, wherein the at least one module is operable to, while the buffered next portion of the media information is presented to the user, provide rewind capability to the user.

26. The mobile communication device of claim 18, wherein the at least one module is operable to output the age of media information that is currently being presented to the user.

27. The mobile communication device of claim 18, where the at least one module is operable to buffer the received next portion of the media information by, at least in part, operating to:
initially store the next portion of the media information in the local memory device; and
when the local memory device reaches a particular level of fullness, store the next portion of the media information in a removable memory module inserted into the mobile communication device.

28. The mobile communication device of claim 18, where the at least one module is operable to buffer the received next portion of the media information by, at least in part, operating to buffer the received next portion of the media information in a temporally rolling manner comprising replacing the oldest buffered media information with the newest buffered media information.

29. A mobile communication device, comprising:
at least one module operable to, at least:
receive media information in a first communication;
present the received media information to a user;
while the received media information is presented to the user, begin a second communication that is unrelated to the first communication;
interface with the user regarding the second communication;
while the user is interfaced with regarding the second communication:
continue to receive media information in the first communication by, at least in part, operating to receive a next portion of the media information; and
buffer the next portion of the media information in a local memory device of the mobile communication device and in a memory device external to the mobile communication device;
after the user is interfaced with regarding the second communication, present the buffered next portion of the media information to the user; and
while presenting the buffered next portion of the media information to the user, retain at least some of the buffered next portion in an on-chip memory buffer after presenting the at least some of the buffered next portion to the user.

30. The mobile communication device of claim 29, wherein the at least one module is operable to, while the buffered next portion of the media information is presented to the user, receive and buffer a further portion of the media information.

31. The mobile communication device of claim 29, wherein the at least one module is operable to, while the buffered next portion of the media information is presented to the user, provide fast-forward capability to the user.

32. The mobile communication device of claim 29, wherein the at least one module is operable to buffer the received next portion of the media information by, at least in part, operating to buffer the received next portion of the media information in a temporally rolling manner comprising replacing the oldest buffered media information with the newest buffered media information.

33. The mobile communication device of claim 29, wherein the at least one module is operable to retain a set amount of the buffered media information after presentation of said set amount to the user.

34. The mobile communication device of claim 29, wherein the at least one module is operable to, prior to the second portion of the media information being received and buffered, receive an indication from the user to perform the second communication.

* * * * *